(12) United States Patent
Kim et al.

(10) Patent No.: US 10,001,211 B2
(45) Date of Patent: Jun. 19, 2018

(54) SHIFT KNOB ASSEMBLY FOR VEHICLE

(71) Applicants: Hyundai Motor Company, Seoul (KR); Kyung Chang Industrial Co., Ltd., Daegu (KR)

(72) Inventors: Eun Sik Kim, Gyeonggi-Do (KR); Dong Won Kim, Daegu (KR)

(73) Assignees: Hyundai Motor Company, Seoul (KR); Kyung Chang Industrial Co., Ltd., Daegu (KR)

( * ) Notice: Subject to any disclaimer, the term of this patent is extended or adjusted under 35 U.S.C. 154(b) by 53 days.

(21) Appl. No.: 15/132,562

(22) Filed: Apr. 19, 2016

(65) Prior Publication Data

US 2017/0191562 A1 Jul. 6, 2017

(30) Foreign Application Priority Data

Dec. 30, 2015 (KR) .................. 10-2015-0189422

(51) Int. Cl.
*F16H 59/02* (2006.01)

(52) U.S. Cl.
CPC ..... *F16H 59/0278* (2013.01); *F16H 59/0208* (2013.01)

(58) Field of Classification Search
CPC ............. F16H 59/0208; F16H 59/0278; F16H 2059/0291; G05G 1/04; G05G 1/06; G05G 1/10; G05G 1/12
See application file for complete search history.

(56) References Cited

U.S. PATENT DOCUMENTS

| | | | | |
|---|---|---|---|---|
| 4,896,556 | A | | 1/1990 | Takada |
| 5,596,894 | A | * | 1/1997 | Lee ................ B60R 25/066 70/181 |
| 6,732,608 | B2 | * | 5/2004 | Suzuki .................. F16H 59/02 74/473.3 |
| 9,285,823 | B2 | * | 3/2016 | Ujimoto ............ F16H 59/0278 |
| 9,441,728 | B2 | * | 9/2016 | Nishijima ............... G05G 1/06 |
| 2003/0106387 | A1 | * | 6/2003 | Lee ................ B60R 25/066 74/473.21 |

(Continued)

FOREIGN PATENT DOCUMENTS

| | | | | |
|---|---|---|---|---|
| DE | 3133250 | A1 | * 3/1983 | ............... G05G 1/06 |
| DE | 102004060303 | A1 | * 6/2006 | ......... F16H 59/0278 |

(Continued)

*Primary Examiner* — Adam D Rogers
(74) *Attorney, Agent, or Firm* — Mintz Levin Cohn Ferris Glovsky and Popeo, P.C.; Peter F. Corless

(57) ABSTRACT

A shift knob assembly includes a shift rod provided with a connection pin; a knob body provided with a mounting space therein, a coupling part into which the shift rod is inserted from a lower portion of the coupling part, and a through hole formed at the lower portion of the coupling part for allowing the connection pin to pass therethrough; a locking part being mounted in the mounting space of the knob body; and an elastic part connected to the locking part for allowing the locking part that is rotated by the connection pin to go back to an original position by elastic force. The shift knob assembly can simplify an assembly process of the knob body for a vehicle, provide efficient assembling/disassembling of the shift knob, and prevent the shift knob from being rotated by external force.

17 Claims, 16 Drawing Sheets

(56) References Cited

U.S. PATENT DOCUMENTS

| | | | | |
|---|---|---|---|---|
| 2003/0143021 A1* | 7/2003 | Whalen | ............... | F16H 59/0278 |
| | | | | 403/322.2 |
| 2010/0304055 A1* | 12/2010 | Hwan | ..................... | B60R 13/00 |
| | | | | 428/31 |
| 2015/0355668 A1* | 12/2015 | Bekaert | .................... | G05G 1/12 |
| | | | | 74/511 R |
| 2016/0312881 A1* | 10/2016 | Morse | ................. | F16H 59/0278 |

FOREIGN PATENT DOCUMENTS

| | | | | |
|---|---|---|---|---|
| EP | 2559918 A1 | * | 2/2013 | ......... F16H 59/0278 |
| FR | 535365 A | * | 4/1922 | ............... G05G 1/12 |
| JP | 10-59001 | | 3/1998 | |
| JP | 3555454 B2 | | 8/2004 | |
| KR | 2002-0038366 A | | 5/2002 | |
| KR | 10-2007-0019397 A | | 2/2007 | |
| KR | 10-2007-0033545 A | | 3/2007 | |
| KR | 10-2008-0004977 A | | 1/2008 | |
| KR | 10-1384534 B1 | | 4/2014 | |

* cited by examiner

SHIFT KNOB ASSEMBLY FOR VEHICLE

CROSS REFERENCE TO RELATED APPLICATION

The present application claims under 35 U.S.C. § 119(a) the benefit of Korean Patent Application No. 10-2015-0189422, filed Dec. 30, 2015, the entire contents of which are incorporated by reference herein.

BACKGROUND

1. Field of the Invention

The present invention generally relates to a shift knob assembly for a vehicle in which an assembly process of the shift knob is simplified, and enables efficient assembling/disassembling of the shift knob.

2. Description of the Related Art

Generally, a vehicle is provided with a transmission for changing torque and rotational speed of an engine, and a shift lever for shifting gears is provided on a driver's side. The shift lever is manufactured in various shapes depending on whether the transmission is a manual transmission or an automatic transmission. The design and material of shift levers can be a factor that affects marketability of vehicles because additional functions for improving driver's convenience recently have been added to the shift levers.

In particular, in the shift lever, a shift knob, with which a driver directly contacts, is configured such that the knob is screwed on threads that are formed on a rod. Thereby, assembling the shift knob may be both difficult and time consuming.

Typically, the shift knob is coupled to the rod by turning the shift knob relative to the rod at least twelve times, and at a thread-less last section of the rod, which is about four threads in length, the shift knob is forcibly inserted into the rod by forcibly turning the shift knob so as to prevent the shift knob from being separated from the rod.

Thereby, the assembly process of the shift knob is both difficult and time consuming. In particular, when the shift knob is forcibly inserted into the rod, it is difficult to precisely align the shift knob such that the front surface of the knob faces forward accurately.

In addition, the shift knob that is assembled with the rod by turning the shift knob is problematic in that, when a driver turns the shift knob very strongly, the shift knob may be forcibly and undesirably turned relative to the rod, and may be separated from the rod.

The foregoing is intended merely to aid in the understanding of the background of the present invention, and is not intended to mean that the present invention falls within the purview of the related art that is already known to those skilled in the art.

SUMMARY

The present invention is directed to a shift knob assembly capable of simplifying an assembly process of a shift knob for a vehicle, realizing efficient assembling/disassembling of a shift knob, and preventing the shift knob from being rotated by external force.

In order to achieve the above object, according to one aspect of the present invention, there is provided a shift knob assembly including: a shift rod provided with a connection pin at an upper portion thereof; a knob body provided with a mounting space therein, a coupling part into which the shift rod is inserted from a lower portion of the coupling part, and a through hole formed at the lower portion of the coupling part for allowing the connection pin to pass therethrough; a locking part being mounted in the mounting space of the knob body, being open through an axial center of the locking part for allowing the coupling part to pass therethrough, and being rotated in a circumferential direction due to contact with the connection pin moving through the through hole when the shift rod is inserted into the coupling part; and an elastic part connected to the locking part for allowing the locking part that is rotated by the connection pin to go back to an original position by elastic force, thereby allowing the knob body to be locked to the shift rod by the connection pin being locked to an upper portion of the locking part, wherein the locking part is elastically moved back to the original position after the connection pin moves up to the upper portion of the locking part, letting the locking part rotate.

The shift knob assembly may further include a guide part that is mounted to an upper portion of the locking part in the mounting space of the knob body, wherein the guide part is open at a center of the guide part so as to allow the coupling part of the knob body to pass therethrough, and guides rotation of the locking part in the circumferential direction by being connected to the locking part.

At least one guide protrusion may be provided on an outer circumference of the locking part by protruding upward; and a guide channel may be provided in the guide part by being open for allowing the guide protrusion to be inserted thereinto, wherein the guide channel extends in a same direction as a rotating direction of the locking part.

The shift knob assembly may further include a damper part for locking the guide part, wherein the damper part is disposed at the upper portion of the guide part in the mounting space of the knob body.

At least one locking groove may be provided on an upper portion of the damper part; and a locking piece for being hooked to the locking groove may be provided in the guide part by extending upward.

A slit corresponding to the connection pin may be provided along an inner circumference of the guide part; and an elastic protrusion is provided in the slit, wherein the elastic protrusion is capable of being elastically deformed and comes into contact with the connection pin.

A plurality of support protrusions may be provided on an upper surface of the guide part by protruding, wherein the support protrusions come into contact with a lower surface of the damper part.

A locking protrusion may be provided on an inner circumference of the locking part by protruding toward the axial center of the locking part so as to come into contact with the connection pin.

The locking protrusion has a flat upper surface, and has a sloping lower surface inclined in a rotating direction of the locking part.

The elastic part is a spring that is configured such that a first end of the elastic part is connected to the locking part, and a second end of the elastic part is connected to the knob body so as to elastically return the locking part to the original position when the locking part is rotated.

A spring accommodation groove for receiving the elastic part may be provided in the locking part, with a passage groove formed on a side of the spring accommodation groove, thereby allowing the second end of the elastic part to be connected to the knob body in a state where the first end of the elastic part is connected to the locking part.

At least one extension part may be provided on an outer circumference of the locking part by extending downward, with a dismounting groove formed on a lower end of the extension part.

The shift knob assembly may further include a dismounting part that is disposed at a lower portion of the extension part of the locking part and is in a ring shape with an opening in a center of the dismounting part, wherein the dismounting part includes: an insertion protrusion that protrudes upward for being inserted into the dismounting groove; and at least one insertion groove that is formed on an outer circumference of the dismounting part by being notched inwards.

A hook may be provided at the lower end of the extension part of the locking part by protruding sideways; and a locking hole may be provided in the dismounting part for allowing the hook to be locked by being hooked thereto.

The shift rod may include a skirt part for elastically supporting the knob body from a bottom of the knob body via an elastic spring.

The knob body may include a covering part for covering the mounting space, wherein the covering part is bolted to the coupling part.

The coupling part of the knob body may be in an oval shape and each of centers of both the guide part and the damper part, into which the coupling part is inserted, may be in an oval shape so as to surround the inserted coupling part.

According to the shift knob assembly configured as described above, it is possible to simplify an assembly process of the knob body for a vehicle, to realize efficient assembling/disassembling of the shift knob, and to prevent the shift knob from being rotated by external force.

Thereby, it is possible to assemble the shift knob efficiently, and to improve durability thereof.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
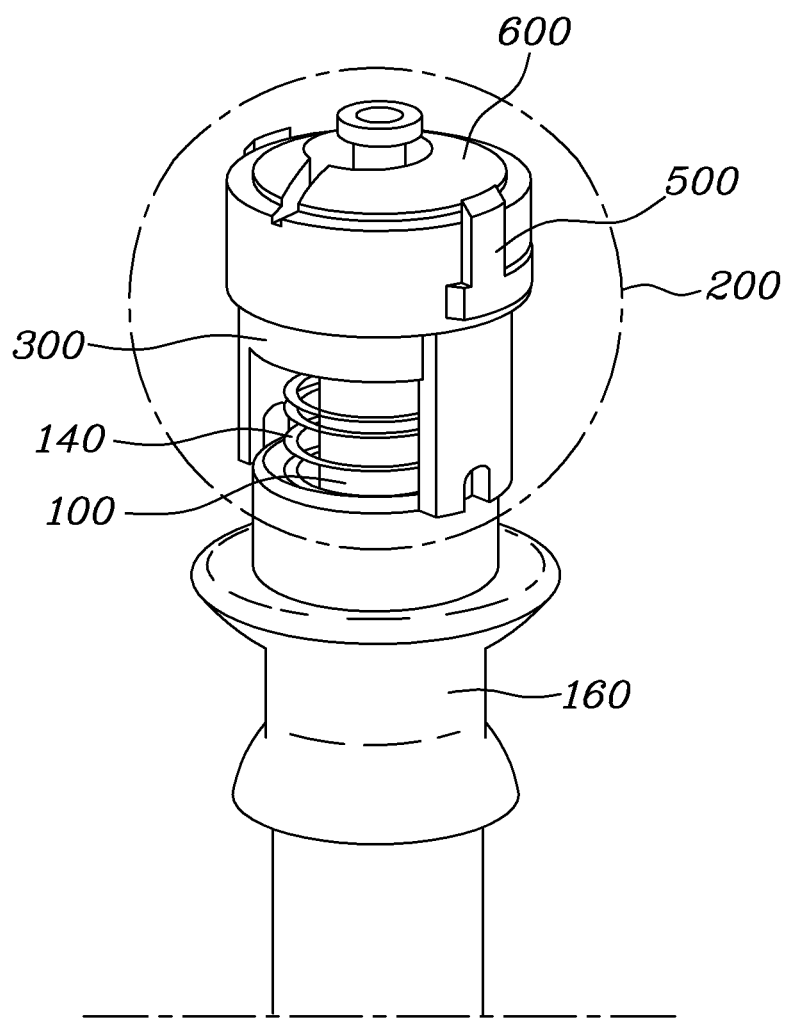
FIG. 1 is a perspective view showing a shift knob assembly according to an embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable medium is stored and executed in a distributed fashion, e.g., by a telematics server or a Controller Area Network (CAN).

Hereinbelow, a shift knob assembly according to an embodiment of the present invention will be described in detail with reference to the accompanying drawings. Throughout the drawings, the same reference numerals will refer to the same or like parts.

Figure 2:
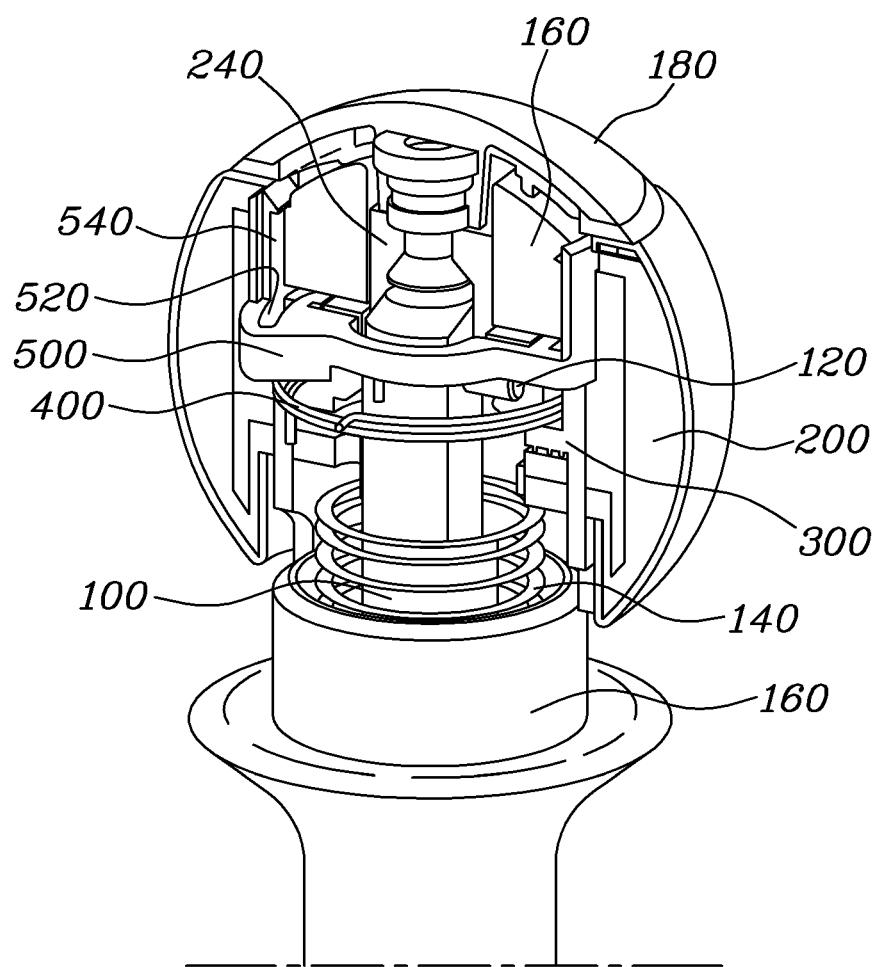
FIGS. 2 to 3 are views showing an inside of the shift knob assembly of FIG. 1.
Figure 3:
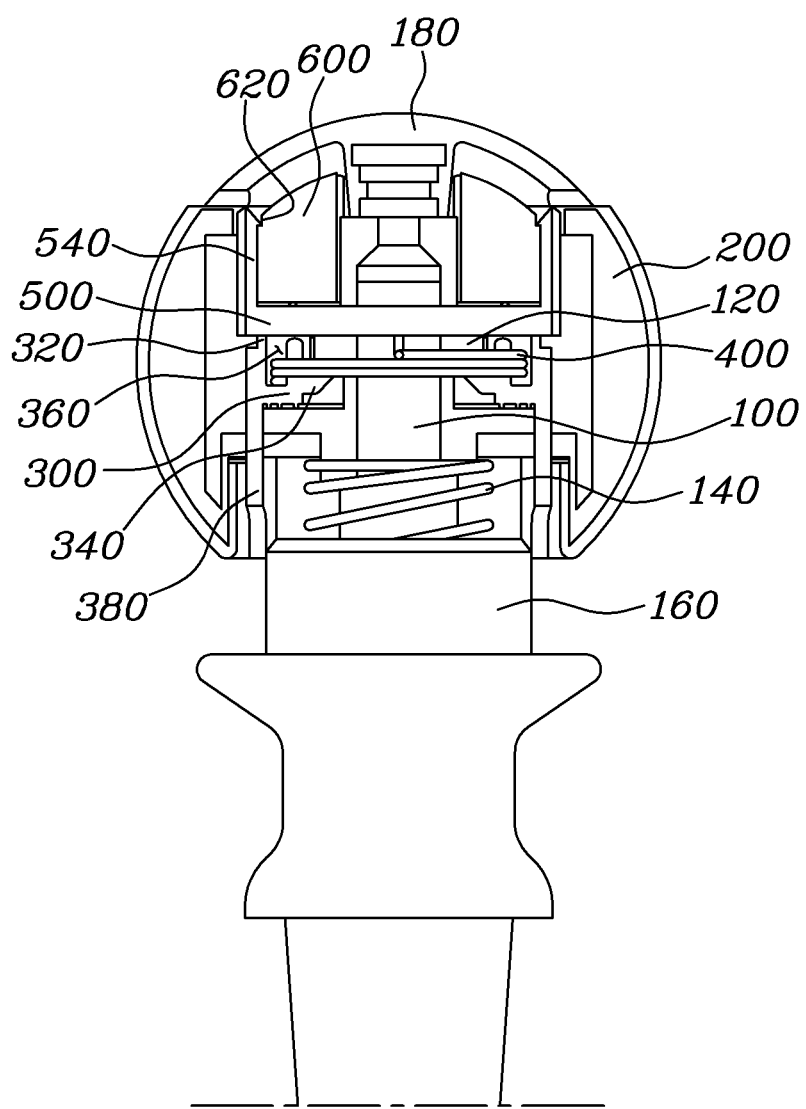
Figure 4:
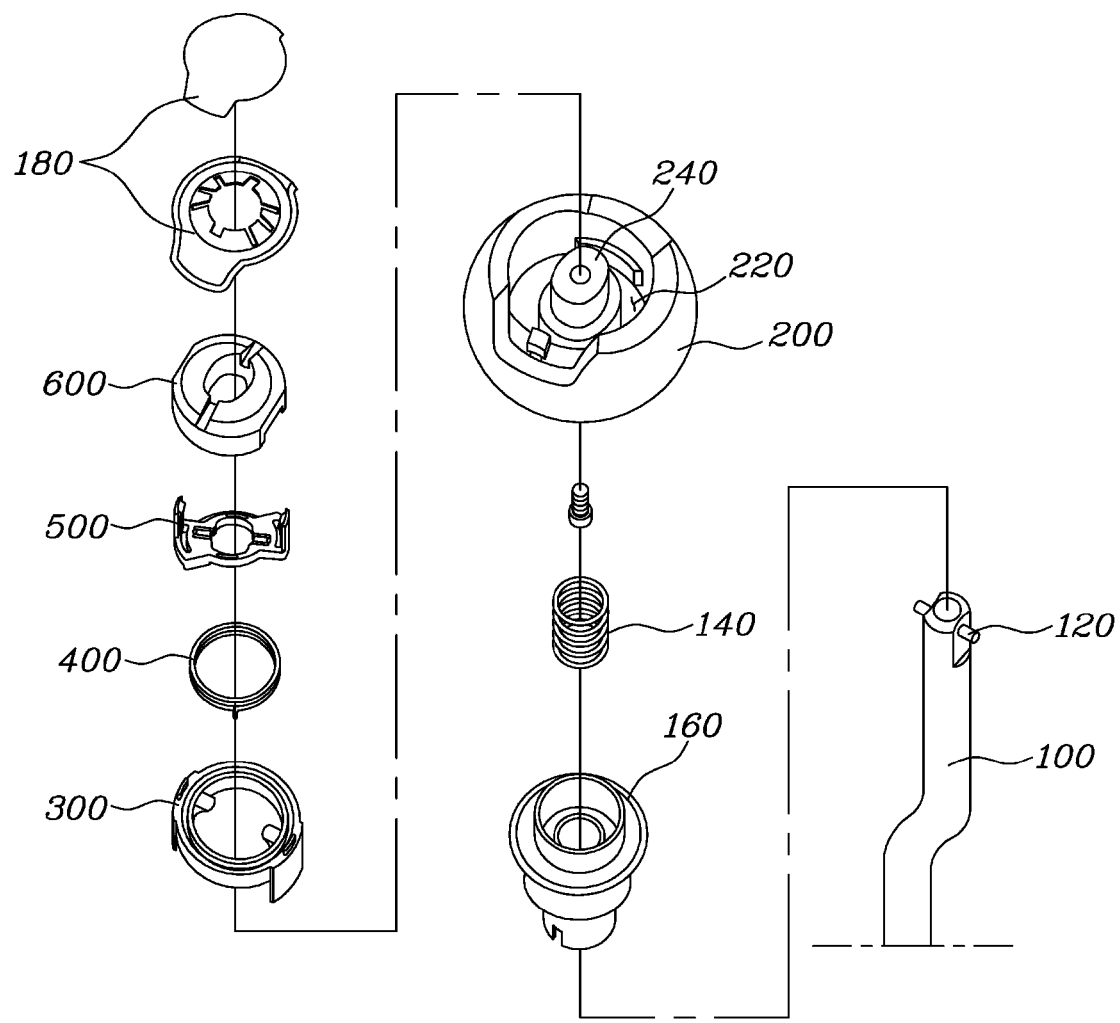
FIG. 4 is an assembly view showing the shift knob assembly of FIG. 1.

FIG. 1 is a perspective view showing a shift knob assembly according to an embodiment of the present invention; FIGS. 2 to 3 are views showing an inside of the shift knob assembly of FIG. 1; and FIG. 4 is an assembly view showing the shift knob assembly of FIG. 1.

Figure 5:
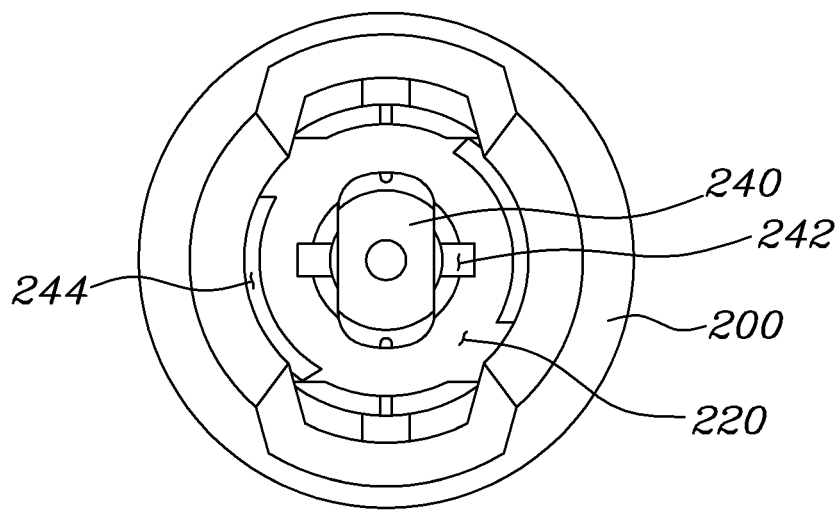
FIG. 5 is a view showing a knob body of the shift knob assembly of FIG. 1.
Figure 6:
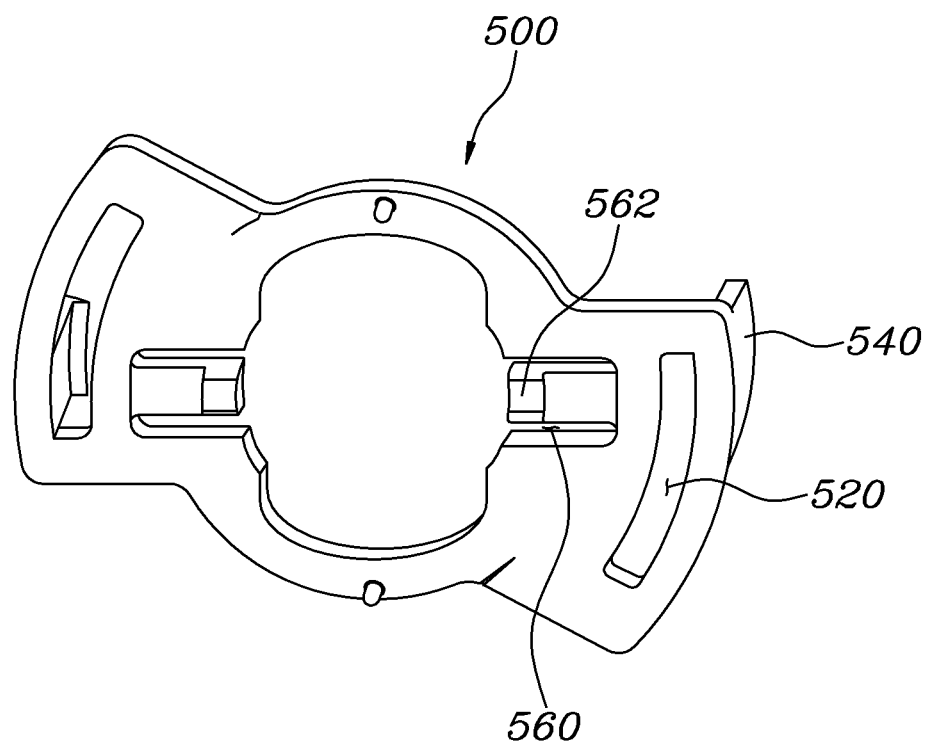
FIG. 6 is a view showing a guide part of the shift knob assembly of FIG. 1.
Figure 7:
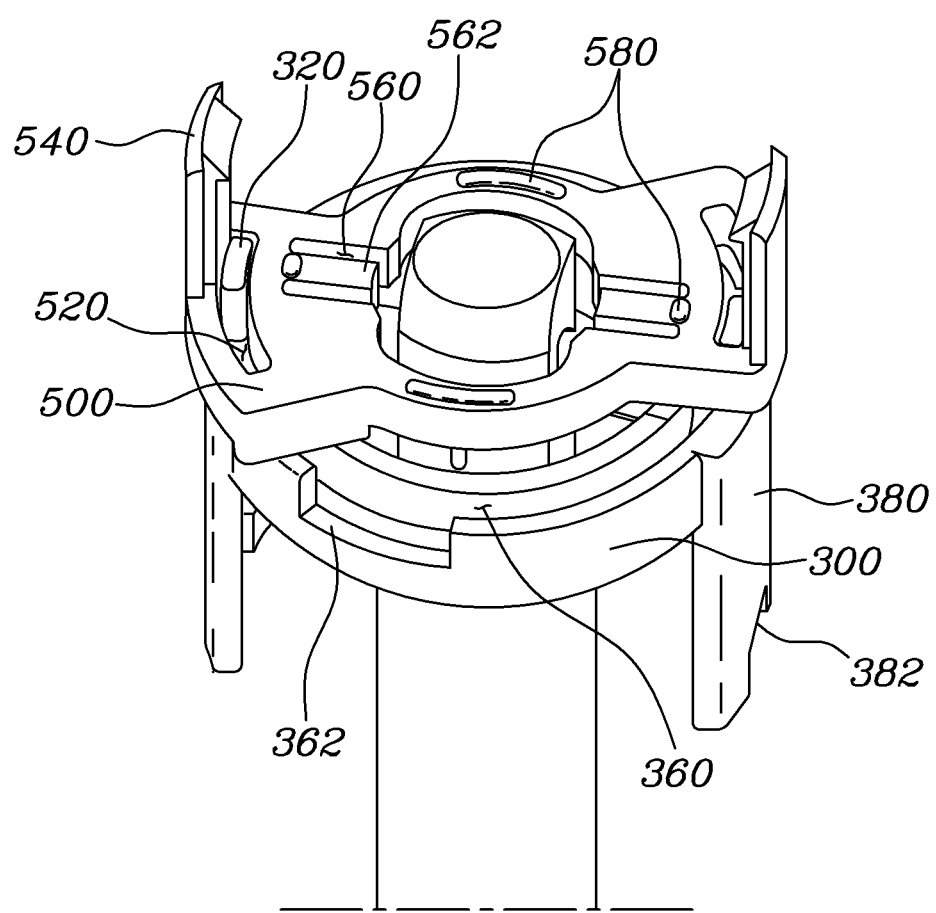
FIG. 7 is a view showing a connection between a locking part and the guide part according to the shift knob assembly of FIG. 1.
Figure 8:
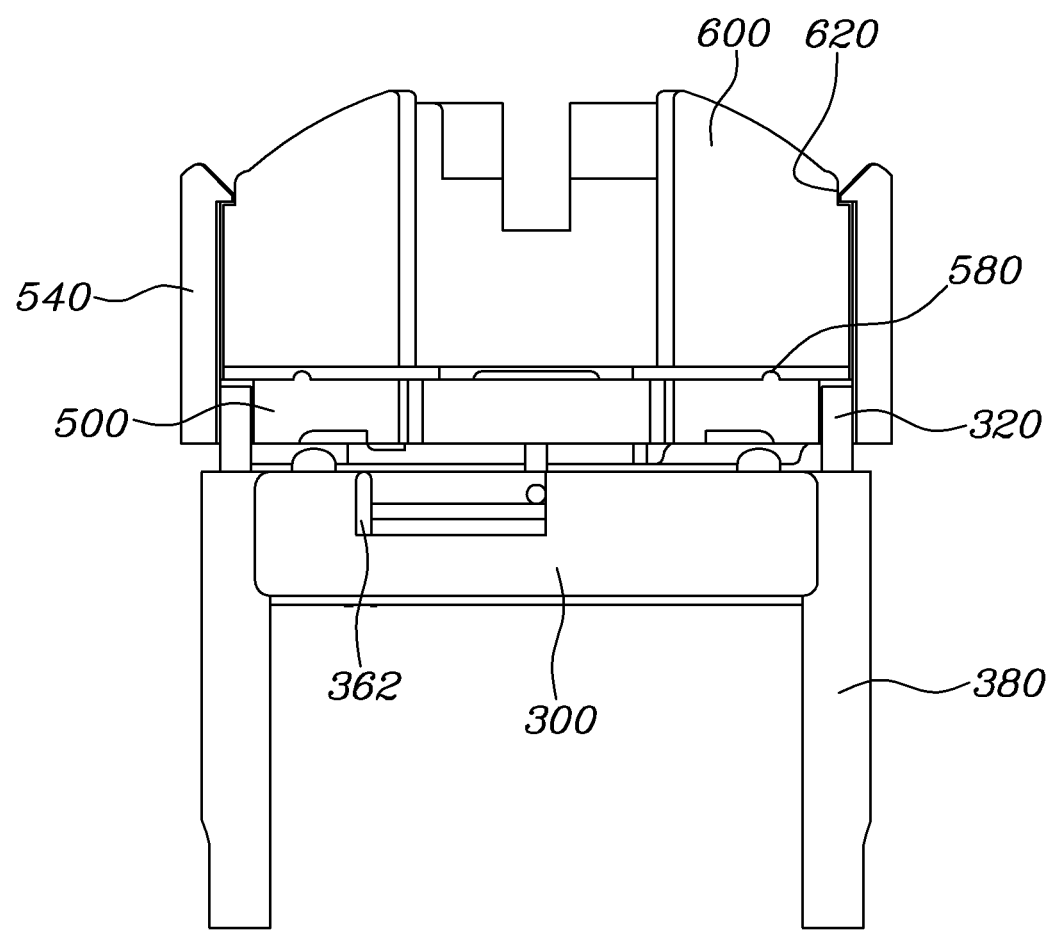
FIGS. 8 to 9 are views showing a connection between the locking part including a damper part of the shift knob assembly of FIG. 1, and the guide part.
Figure 9:
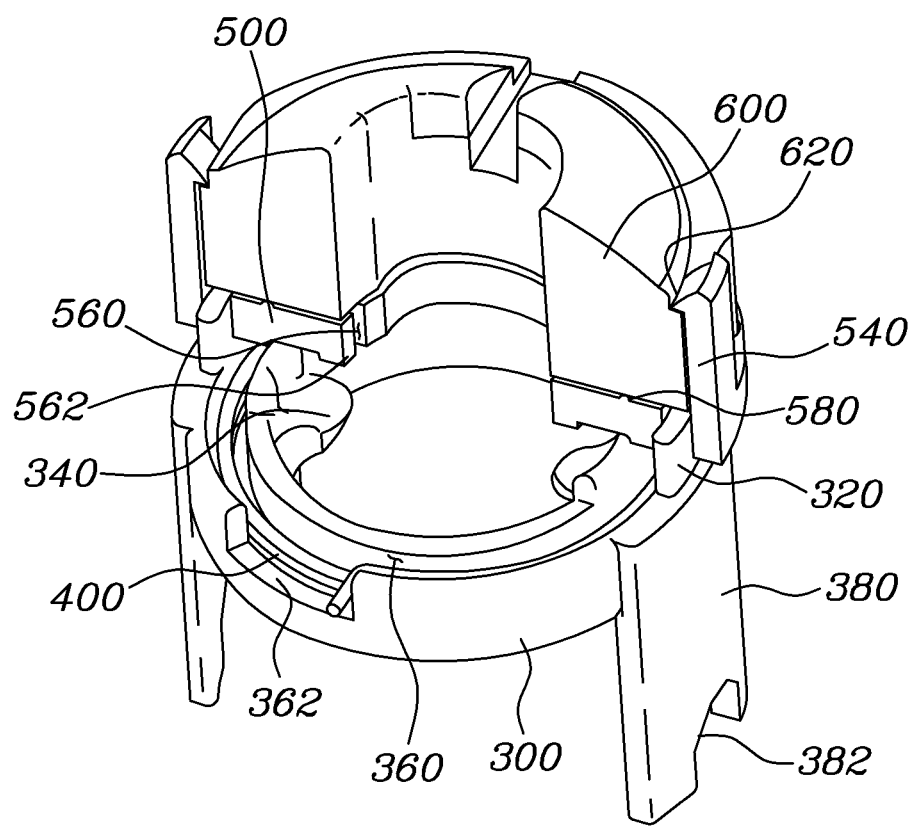

Further, FIG. 5 is a view showing a knob body of the shift knob assembly of FIG. 1; FIG. 6 is a view showing a guide part of the shift knob assembly of FIG. 1; FIG. 7 is a view showing a connection between a locking part and the guide part according to the shift knob assembly of FIG. 1; and FIGS. 8 to 9 are views showing a connection between the locking part including a damper part of the shift knob assembly of FIG. 1, and the guide part.

Figure 10:
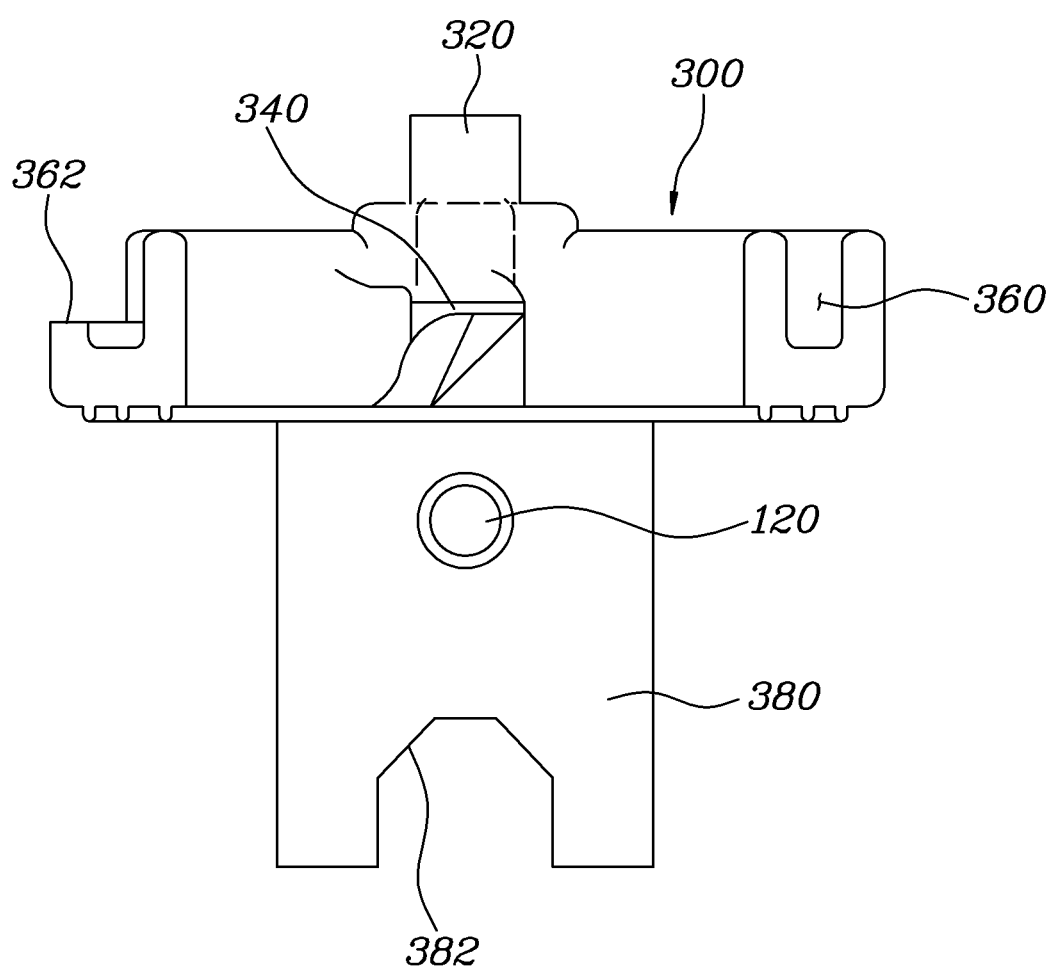
FIGS. 10 to 12 are views showing a locking operation of the locking part of the shift knob assembly of FIG. 1.
Figure 11:
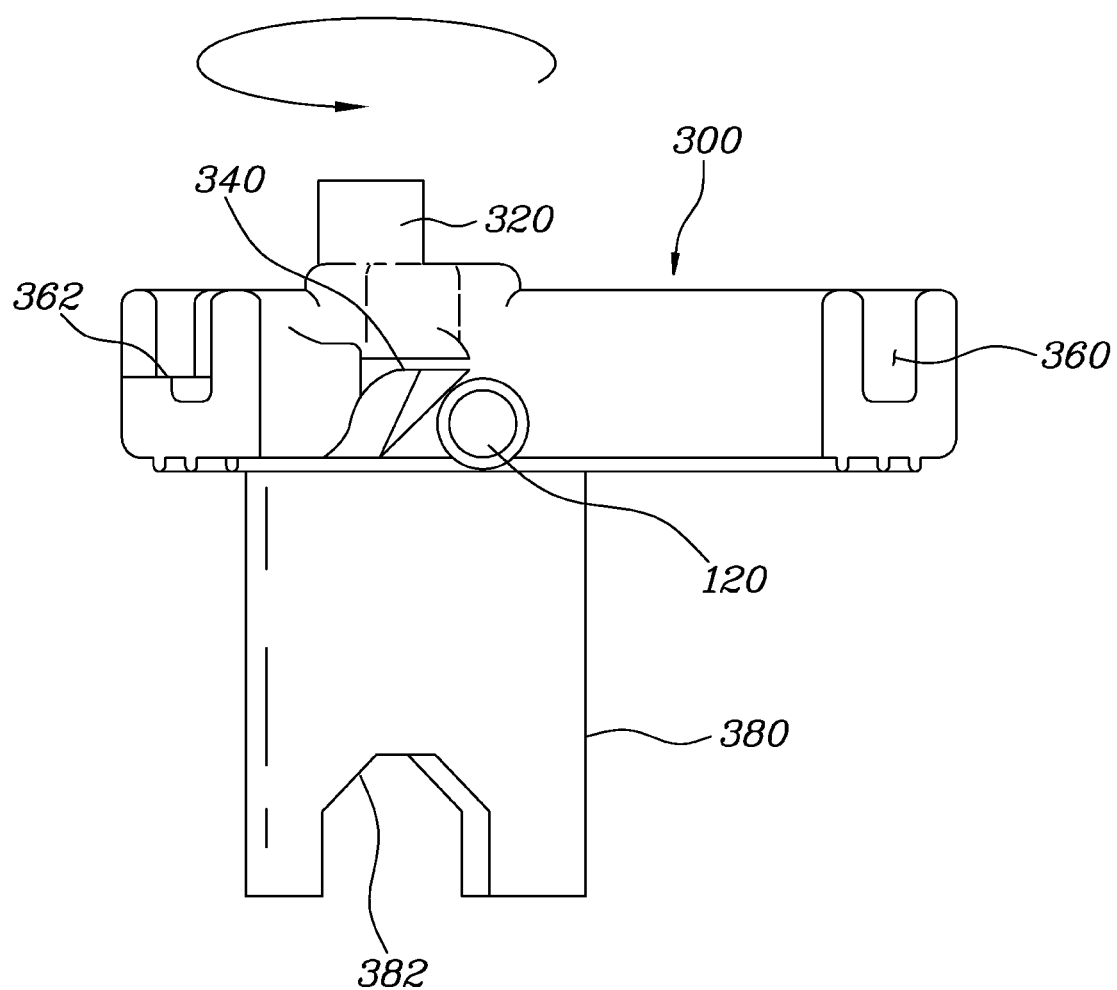
Figure 12:
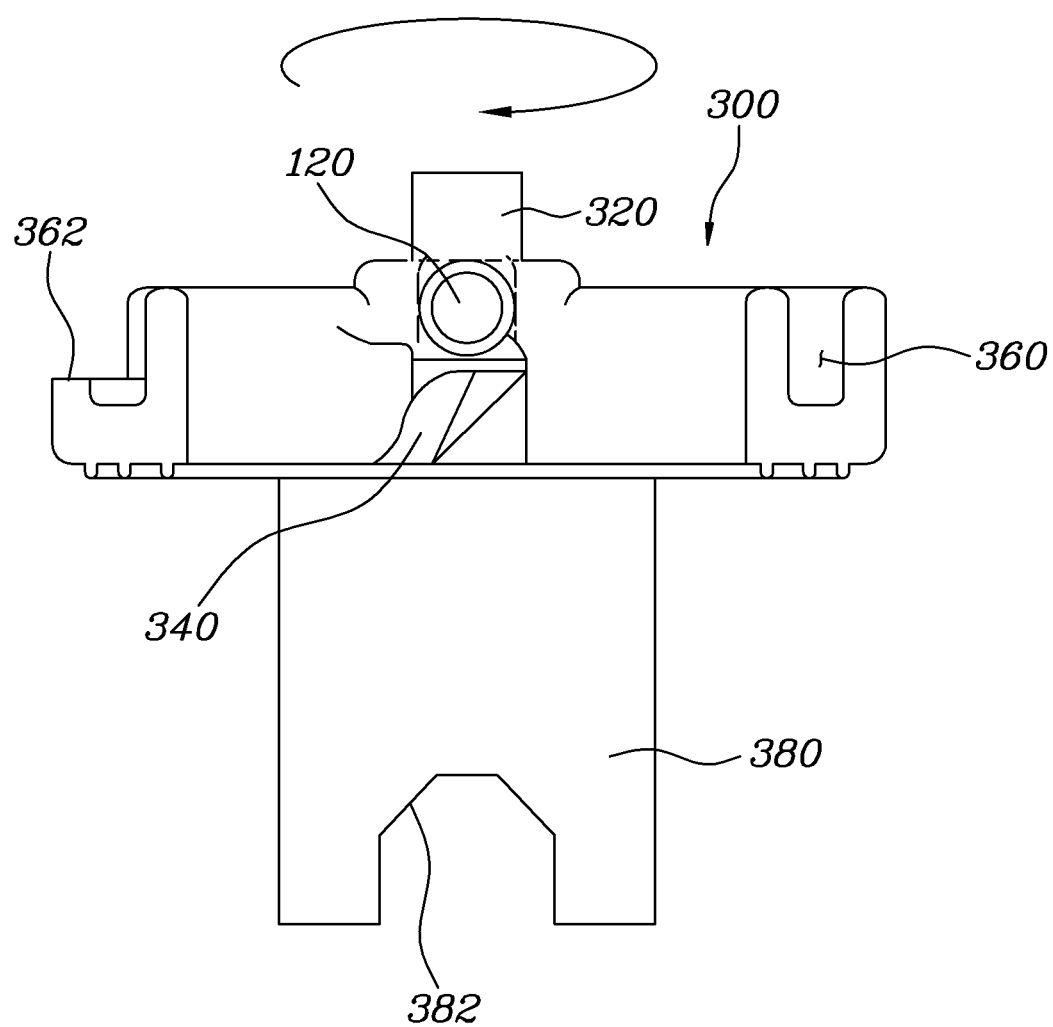
Figure 13:
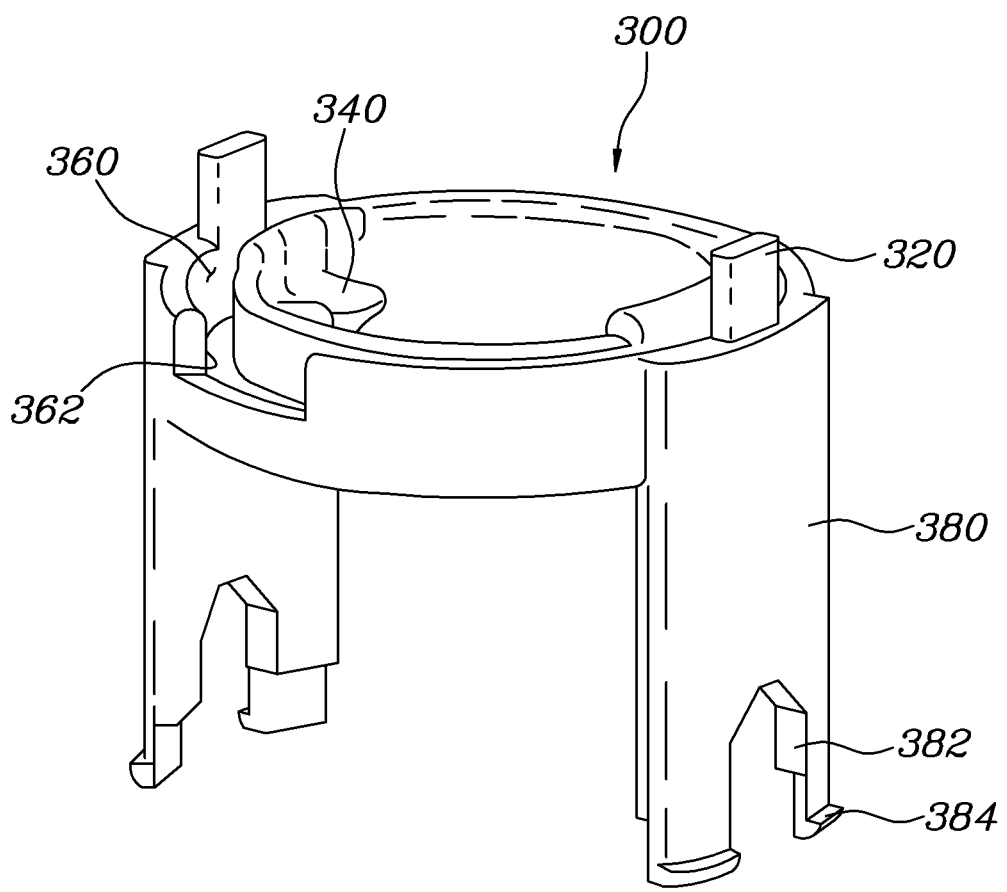
FIGS. 13 to 15 are views showing a dismounting part of the shift knob assembly of FIG. 1.
Figure 14:
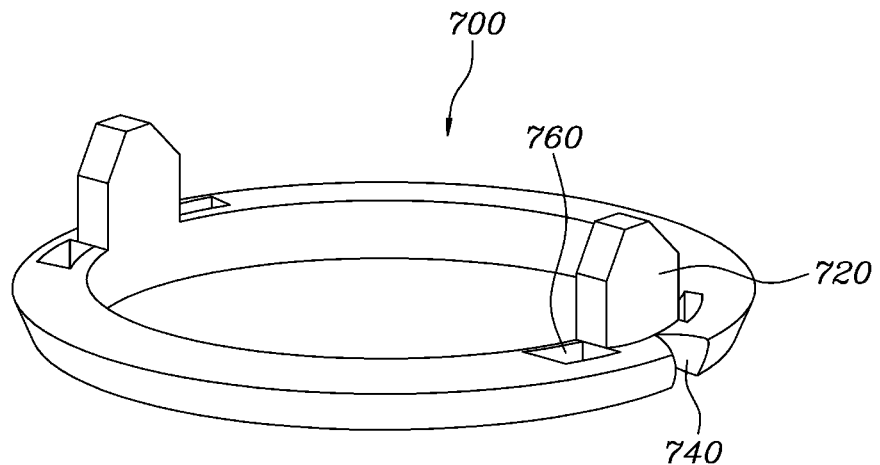
Figure 15:
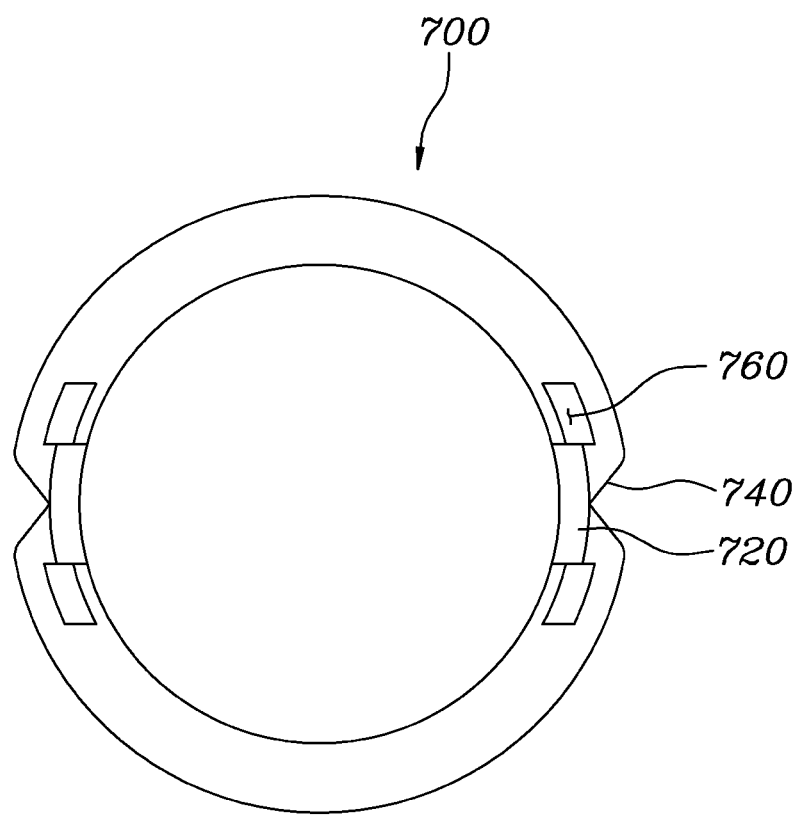
Figure 16:
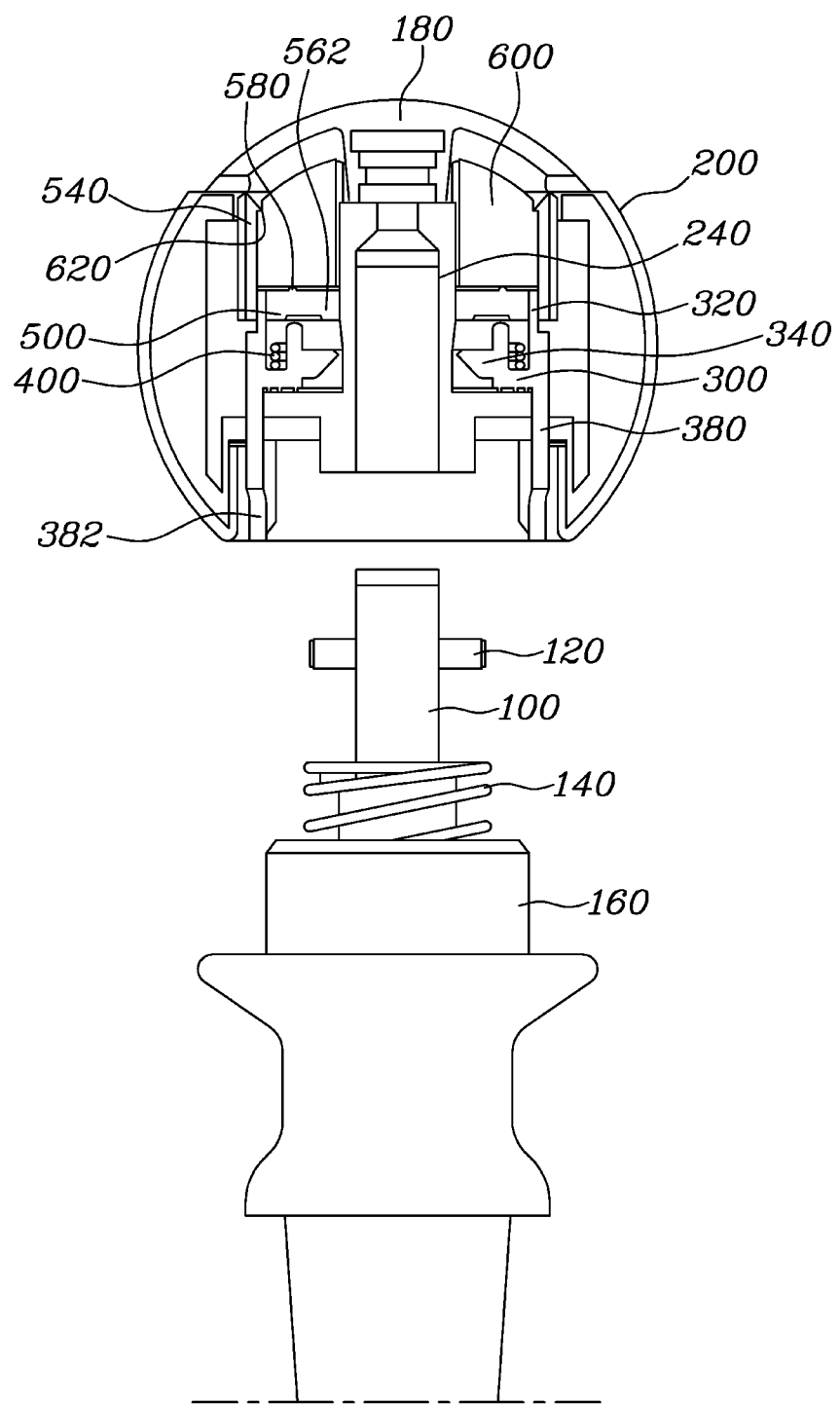
FIGS. 16 to 18 are views showing an assembly process of the shift knob assembly of FIG. 1.
Figure 17:
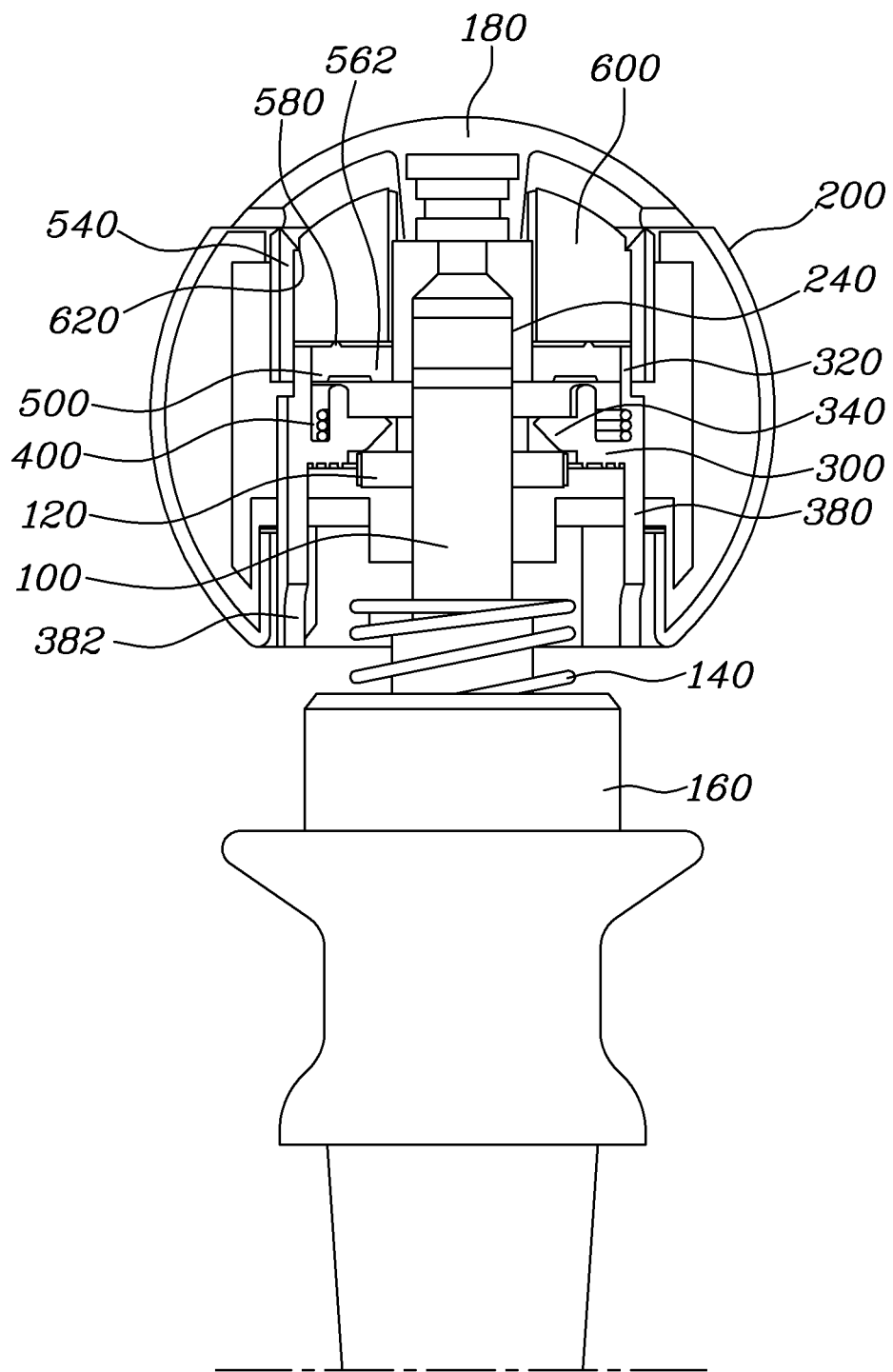
Figure 18:
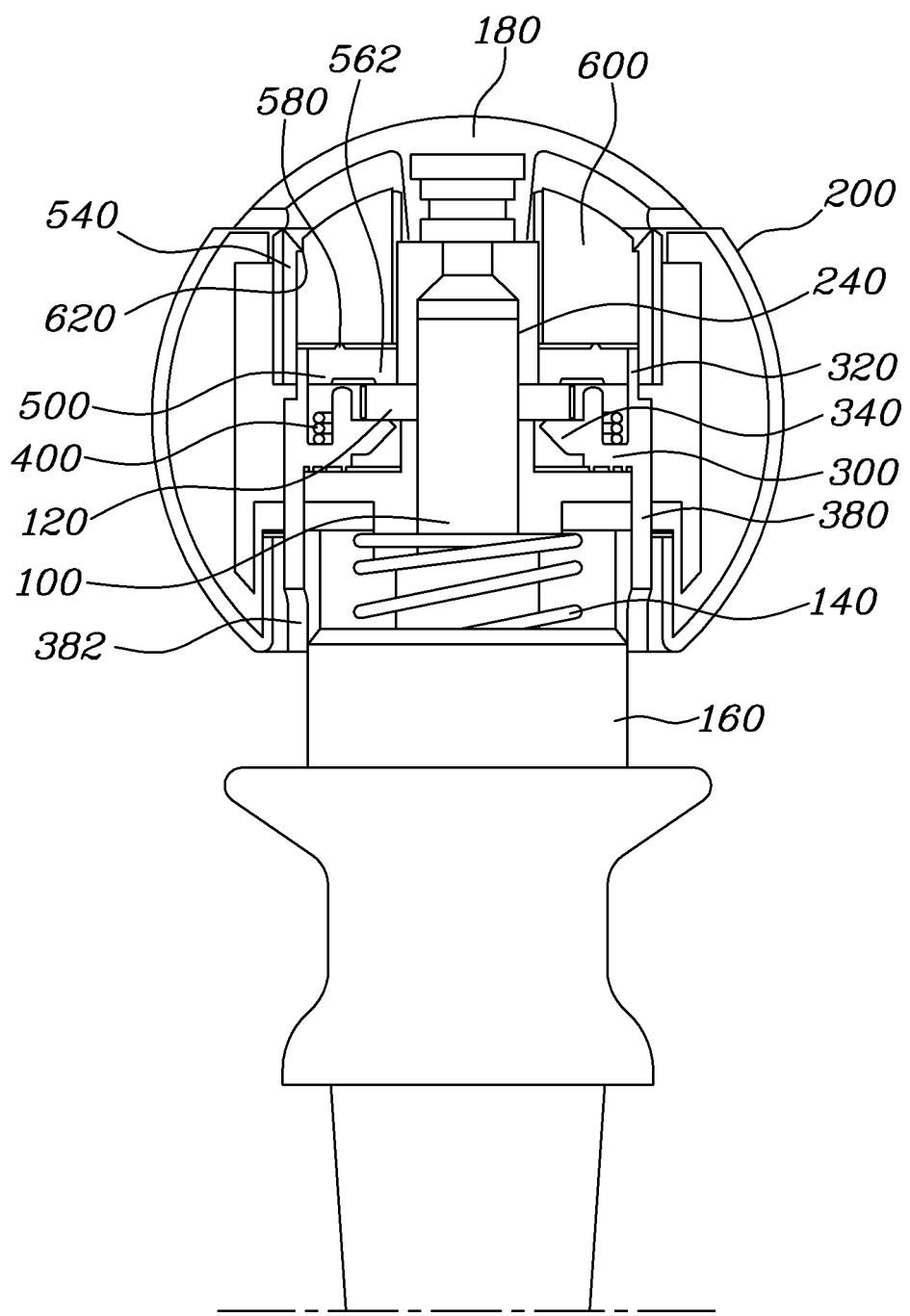

FIGS. 10 to 12 are views showing a locking operation of the locking part of the shift knob assembly of FIG. 1; FIGS. 13 to 15 are views showing a dismounting part of the shift knob assembly of FIG. 1; and FIGS. 16 to 18 are views showing an assembly process of the shift knob assembly of FIG. 1.

As shown in FIGS. 1 to 5, the shift knob assembly according to the present invention includes: a shift rod 100 provided with a connection pin 120 at an upper portion of the shift rod 100; a knob body 200 provided with a mounting space 220 therein, a coupling part 240 into which the shift rod 100 is inserted from a lower portion of the coupling part 240, and a through hole 242 formed at the lower portion of the coupling part 240 for allowing the connection pin 120 to pass therethrough; a locking part 300 being mounted in the mounting space 220 of the knob body 200, being open through an axial center of the locking part 300 for allowing the coupling part 240 to pass therethrough, and being rotated in a circumferential direction due to contact with the connection pin 120 moving through the through hole 242 when the shift rod 100 is inserted into the coupling part 240; and an elastic part 400 connected to the locking part 300 for allowing the locking part 300 that is rotated by the connection pin 120 to go back to an original position by elastic force, thereby allowing the knob body 200 to be locked to the shift rod 100 by the connection pin 120 being locked to an upper portion of the locking part 300, wherein the locking part 300 is elastically moved back to the original position after the connection pin 120 moves up to the upper portion of the locking part 300, letting the locking part 300 rotate.

According to the present invention, when the knob body 200 is coupled to the shift rod 100, the knob body 200 is locked to the shift rod 100 as the locking part 300 is locked to the shift rod 100. In other words, according to the present invention, when the knob body 200 is inserted from an upper portion of the shift rod 100 to the lower portion of the shift rod 100, the connection pin 120 of the shift rod 100 rotates the locking part 300 that is mounted to the mounting space 220 of the knob body 200, and then the rotated locking part 300 is moved back to the original position by the elastic part 400 after the connection pin 120 passes through the locking part 300. Similarly, after the connection pin 120 moves up to the upper portion of the locking part 300, the connection pin 120 is hooked to the locking part 300. Thereby, the knob body 200 is inserted into the shift rod 100, and then the knob body 200 is locked to the shift rod 100 via the locking part 300.

In this way, the knob body 200 is mounted to the shift rod 100 from the upper portion of the shift rod 100 to the lower portion thereof, whereby the knob body 200 is locked to the shift rod 100 via the locking part 300. Thus, it is possible to mount the knob body 200 to the shift rod 100 through a simple assembly process.

Specifically, as shown in FIGS. 2 and 7, the shift knob assembly may further include a guide part 500 that is mounted to the upper portion of the locking part 300 in the mounting space 220 of the knob body 200, wherein the guide part 500 is open at a center of the guide part 500 so as to allow the coupling part 240 of the knob body 200 to pass therethrough, and guides rotation of the locking part 300 in the circumferential direction by being connected to the locking part 300.

The guide part 500 prevents the coupling part 240 of the knob body 200 from rotating after the coupling part 240 is inserted into the guide part 500. Further, the guide part 500 guides rotation of the locking part 300 in the circumferential direction by being connected to the locking part 300. Thereby, the guide part 500 determines an initial position and a maximum rotational position of the locking part 300.

Specifically, as shown in FIGS. 6 to 7, at least one guide protrusion 320 may be provided on an outer circumference of the locking part 300 by protruding upward; and a guide channel 520 may be provided in the guide part 500 by being open for allowing the guide protrusion 320 to be inserted thereinto, wherein the guide channel 520 extends in a same direction as a rotating direction of the locking part 300.

In this way, the guide protrusion 320 is provided on the locking part 300 by protruding and extending upward, and the guide channel 520 for allowing the guide protrusion 320 to be inserted thereinto is provided in the guide part 500. Thereby, the rotation of the locking part 300 is limited within the guide channel 520. Thus, the locking part 300 that goes back to the original position by the elastic part 400 allows the guide protrusion 320 to remain in an initial position by blocking the guide protrusion 320 with an end of the guide channel 520, and prevents the locking part 300 from excessively rotating.

Meanwhile, the shift knob assembly may further include a damper part 600 for locking the guide part 500, wherein the damper part 600 is disposed at an upper portion of the guide part 500 in the mounting space 220 of the knob body 200.

In this way, the damper part 600 is provided at the upper portion of the guide part 500 in the mounting space 220 of the knob body 200, thereby as the damper part 600 presses the guide part 500, a location of the guide part 500 is fixed. The damper part 600 may be a mass damper that has a predetermined weight, thereby providing weightiness during gear shift and absorbing vibrations, and thus it is possible to improve handling.

Meanwhile, as shown in FIGS. 8 to 9, at least one locking groove 620 may be provided on an upper portion of the damper part 600; and a locking piece 540 for being hooked to the locking groove 620 may be provided in the guide part 500 by extending upward.

In this way, the locking groove 620 is provided on the upper portion of the damper part 600. The locking piece 540 is provided in the guide part 500 by extending upward, and is hooked to the locking groove 620, thereby allowing the damper part 600 to be locked to the guide part 500. The locking piece 540 of the guide part 500 and the locking groove 620 of the damper part 600 may be at least two in number, respectively, and be provided along each circumference of the guide part 500 and the damper part 600, thereby enabling the damper part 600 to be locked to the guide part 500 firmly.

Meanwhile, a slit 560 corresponding to the connection pin 120 may be provided along an inner circumference of the guide part 500; and an elastic protrusion 562 may be provided in the slit 560, wherein the elastic protrusion 562 is capable of being elastically deformed and comes into contact with the connection pin 120.

In other words, as shown in FIGS. 6 to 7, the slit 560 is provided along the inner circumference of the guide part 500, and the elastic protrusion 562 that is capable of being elastically deformed is provided in the slit 560. Thereby, when the connection pin 120 of the shift rod 100 comes into contact with the elastic protrusion 562, the elastic protrusion 562 is bent from the slit 560, thereby eliminating a gap between the elastic protrusion 562 and the connection pin 120. Thus, it is possible to eliminate distance between the shift rod 100 and the guide part 500 by contacting with the connection pin 120 via the elastic protrusion 562 of the guide part 500.

Herein, as shown in FIGS. 7 to 8, a plurality of support protrusions 580 may be provided on an upper surface of the guide part 500 by protruding, wherein the support protrusions 580 come into contact with a lower surface of the damper part 600, thereby providing a gap between the guide part 500 and the damper part 600 for allowing the elastic protrusion 562 to be bent upward and downward.

Meanwhile, a locking protrusion 340 may be provided on an inner circumference of the locking part 300 by protruding toward the axial center of the locking part 300 so as to come into contact with the connection pin 120. Herein, a symmetrical pair of the locking protrusions 340 may be provided on the inner circumference of the locking part 300 so as to correspond to the connection pin 120. Thereby, when the connection pin 120 moves from the lower portion of the locking part 300 to the upper portion of the locking part 300, coming into contact with the locking protrusion 340, the locking part 300 is rotated and the connection pin 120 completely moves up over the locking protrusion 340. Thereby, the connection pin 120 is hooked to an upper portion of the locking protrusion 340, preventing the connection pin 120 from being separated from the locking part 300.

Specifically, the locking protrusion 340 may have a flat upper surface, and have a sloping lower surface inclined in a rotating direction of the locking part 300. In this way, the sloping lower surface of the locking protrusion 340 is formed to have curvature in the rotating direction of the locking part 300 such that when the connection pin 120 comes into contact with the lower surface of the locking protrusion 340, the connection pin 120 pushes up the sloping surface of the locking protrusion 340, thereby enabling the locking part 300 to be rotated. Further, the upper surface of the locking protrusion 340 is in a flat shape, whereby the connection pin 120 that moves from a lower portion of the locking protrusion 340 to the upper portion of the locking protrusion 340 is seated on the upper portion of the locking protrusion 340, and thus it is possible to prevent the connection pin 120 from being separated from the locking part 300.

As shown in FIGS. 10 to 12, as the knob body 200 is inserted into the shift rod 100, the locking part 300 moves downward. And then, the locking part 300 is rotated by the connection pin 120 that comes into contact with the lower portion of the locking protrusion 340. And after the connection pin 120 completely moves up to the upper portion of the locking protrusion 340, the locking part 300 goes back to the original position by the elastic part 400, whereby the connection pin 120 is seated on the upper portion of the locking protrusion 340.

Thus, it is possible to lock the knob body 200 to the shift rod 100 via the locking part 300 through a simple assembly process of inserting the knob body 200 into the shift rod 100, because the locking part 300 is rotated by the connection pin 120, and then goes back to the original position, whereby the connection pin 120 is locked to the locking protrusion 340.

Meanwhile, as shown in FIG. 9, the elastic part 400 may be a spring that is configured such that a first end of the elastic part 400 is connected to the locking part 300, and a second end of the elastic part 400 is connected to the knob body 200 so as to elastically return the locking part 300 to the original position when the locking part 300 is rotated. In other words, the elastic part 400 may have a torsion spring, wherein the first end of the elastic part 400 is connected to the locking part 300, and a second end of the elastic part 400 is connected to the knob body 200 so as to elastically return the rotated locking part 300 to the original position.

Herein, a spring accommodation groove 360 for receiving the elastic part 400 may be provided in the locking part 300, with a passage groove 362 formed on a side of the spring accommodation groove 360, thereby allowing the second end of the elastic part 400 to be connected to the knob body 200 in a state where the first end of the elastic part 400 is connected to the locking part 300. In this way, the spring accommodation groove 360 of the locking part 300 is provided with the elastic part 400 having the torsion spring, thereby preventing the elastic part 400 from being separated from the locking part 300, and allowing the first end of the elastic part 400 to be connected to the locking part 300 and the second end of the elastic part 400 to be connected to the knob body 200 by extending through the passage groove 362 in a state where the elastic part 400 is provided in the spring accommodation groove 360.

Meanwhile, at least one extension part 380 may be provided on an outer circumference of the locking part 300 by extending downward, with a dismounting groove 382 formed on a lower end of the extension part 380, thereby allowing the knob body 200 to be dismounted from the shift rod 100.

In other words, the extension part 380 of the locking part 300 extends downward, whereby the dismounting groove 382 is exposed at a lower portion of the knob body 200. Thereby, it is possible to forcibly rotate the locking part 300 by inserting a tool, such as a driver, into the dismounting groove 382. Thereby, as the locking protrusion 340 of the locking part 300 is separated from the connection pin 120, the locking part 300 can be separated from the shift rod 100, and thus it is possible to separate the knob body 200 from the shift rod 100.

In addition, as shown in FIG. 5, a guide groove 244 may be provided in the knob body 200 so that the locking part 300 can be rotated in a state where the tool is inserted into the extension part 380 of the locking part 300.

Meanwhile, as shown in FIGS. 14 to 15, the shift knob assembly may further include a dismounting part 700 that is disposed at a lower portion of the extension part 380 of the locking part 300 and is in a ring shape with an opening in a center of the dismounting part 700, wherein the dismounting part 700 includes: an insertion protrusion 720 that protrudes upward for being inserted into the dismounting groove 382; and at least one insertion groove 740 that is formed on an outer circumference of the dismounting part 700 by being notched inwards.

The dismounting part 700 is connected to the lower portion of the extension part 380 of the locking part 300, thereby being exposed at the lower portion of the knob body 200. Herein, a design of the lower portion of the knob body 20 can be improved depending on a design of the dismounting part 700. In particular, the dismounting part 700 is rotated along with the locking part 300 with the insertion protrusion 720 being inserted into the dismounting groove 382 of the extension part 380, and the insertion groove 740 is formed on the outer circumference of the dismounting part 700, thereby allowing an additional tool, such as a driver, to be easily inserted into the insertion groove 740 that is exposed at the lower portion of the knob body 200. Thereby, when the dismounting part 700 is rotated by inserting the tool into the insertion groove 740 of the dismounting part 700, the locking part 300 is rotated along with the dismounting part 700, and the locking protrusion 340 is separated from the connection pin 120. Thus, the knob body 200 can be separated from the shift rod 100 with ease.

Meanwhile, as shown in FIGS. 13 and 14, a hook 384 may be provided at the lower end of the extension part 380 of the locking part 300 by protruding sideways; and a locking hole 760 may be provided in the dismounting part 700 for allowing the hook 384 to be locked by being hooked thereto. Thereby, it is possible to easily couple the locking part 300 and the dismounting part 700 together. In other words, by simply inserting the extension part 380 of the locking part 300 into the locking hole 760 of the dismounting part 700, the hook 384 is hooked to the locking hole 760, thereby maintaining a locked state therebetween.

Meanwhile, the shift rod 100 may include a skirt part 160 for elastically supporting the knob body 200 from a bottom of the knob body 200 via an elastic spring 140.

The vertically movable skirt 160 is provided at the upper portion of the shift rod 100, wherein a location of the skirt 160 is limited with the elastic spring 140, which is disposed between the lower portion of the knob body 200 and the skirt 160. In other words, in a normal state, the skirt 160 is at the upper portion of the shift rod 100 so as to prevent the lower portion of the knob body 200 and the shift rod 100 from being exposed to outside. On the contrary, during disassembly, the skirt 160 is moved downward, whereby the locking part 300 is exposed at the lower portion of the knob body 200. Thus, it is possible to forcibly rotate and dismount the locking part 300 using the additional tool.

In this way, a design of the lower portion of the knob body 200 can be improved by providing the skirt 160. Further, the locking part 300 can be selectively exposed by providing the skirt 160 when disassembly is needed. Furthermore, the skirt 160 prevents a user except a worker from easily finding the locking part 300, thereby preventing the knob body 200 from being separated.

Meanwhile, the knob body 200 may include a covering part 180 for covering the mounting space 220, wherein the covering part 180 is bolted to the coupling part 240.

In other words, the covering part 180 for covering the mounting space 220 is provided at top of the knob body 200, whereby the covering part 180 fixes a location of the damper part 600 that is provided in the mounting space 220. Thus, the damper part 600 enables supporting parts to be firmly locked. Further, the covering part 180 is bolted to the coupling part 240, thereby being firmly locked to the knob body 200.

Meanwhile, the coupling part 240 of the knob body 200 may be in an oval shape and each of centers of both the guide part 500 and the damper part 600, into which the coupling part 240 is inserted, may be in an oval shape so as to surround the inserted coupling part 240.

In other words, according to the present invention, the guide part 500 and the damper part 600 that are provided in the mounting space 220 of the knob body 200 are configured not to be rotated within the mounting space 220, but only the locking part 300 is capable of being rotated. To achieve this, the coupling part 240 of the knob body 200 is in an oval shape, and each of the centers of both the guide part 500 and the damper part 600, into which the coupling part 240 is inserted, is in an oval shape so as to correspond to the coupling part 240, thereby when the coupling part 240 is inserted into the guide part 500 and the damper part 600, it is possible to prevent the guide part 500 and the damper part 600 from being rotated by being blocked with coupling part 240 that is in the oval shape. Of course, as the coupling part 240 is in the oval shape, thereby the upper portion of the shift rod 100 should be in an oval shape.

Reference will be made hereinbelow to an assembly process of the shift knob of the shift knob assembly according to the present invention described above. As shown in FIG. 16, the coupling part 240 of the knob body 200 should be disposed to be matched with the shift rod 100 at the upper portion of the shift rod 100. Here, the locking part 300 can remain in the initial position by the elastic part 400.

In this state, as shown in FIG. 17, when the knob body 200 is moved toward the shift rod 100, the connection pin 120 of the shift rod 100 comes into contact with the locking protrusion 340 of the locking part 300. And then, while the connection pin 120, which moves from the lower portion of the locking part 300 to the upper portion of the locking part 300, moves along the sloping surface formed on the locking protrusion 340 of the locking part 300, the locking part 300 is rotated.

Next, as shown in FIG. 18, when the knob body 200 is fully inserted into the shift rod 100, the connection pin 120 of the shift rod 100 is disposed at the upper portion of the locking protrusion 340 of the locking part 300, and the locking part 300 goes back to the initial position by the elastic force of the elastic part 400. Thereby, the connection pin 120 of the shift rod 100 comes into contact with and is locked to the upper portion of the locking protrusion 340 of the locking part 300. Thereby, it is impossible for the shift rod 100 to be separated from the lower portion of the locking part 300. Thus, assembling the shift rod 100 with the knob body 200 is completed.

Therefore, the knob body 200 is locked to the shift rod 100 by the locking part 300, whereby it is possible to prevent rotation and separation of the knob body 200, and it is also possible to complete assembling the knob body 200 through the simple process of inserting the knob body 200 into the shift rod 100.

Meanwhile, reference will be made hereinbelow to a disassembly process of the shift knob of the shift knob assembly according to the present invention described above. The skirt 160 that is provided in the shift rod 100 is moved downward, and then the extension part 380 of the locking part 300, which is exposed at the lower portion of the knob body 200, is forcibly rotated by inserting the additional tool thereinto, thereby enabling the connection pin 120 to be separated from the locking protrusion 340 of the locking part 300. Thereby, the locking part 300 and the shift rod 100 are ready to be disassembled. In this state, when the knob body 200 is moved upward, it is easy to dismount the knob body 200 from the shift rod 100.

According to the shift knob assembly configured as described above, it is possible to make an assembly process of the knob body 200 for a vehicle simple, to realize efficient assembling/disassembling of the shift knob, and to prevent the shift knob from being rotated by external force.

Thereby, it is possible to assemble the shift knob efficiently, and to improve durability thereof.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A shift knob assembly, comprising:
a shift rod provided with a connection pin at an upper most axial end of the shift rod;
a knob body provided with a mounting space therein, a coupling part into which the shift rod is inserted, and a through hole formed at the coupling part for allowing the connection pin to pass therethrough;
a locking part being mounted in the mounting space of the knob body, being open through an axial center of the locking part for allowing the coupling part to pass therethrough, and configured to be rotated in a circum- ferential direction by the connection pin due to contact with the connection pin moving through the through hole when the shift rod is inserted into the coupling part; and an elastic part connected to the locking part for allowing the locking part that is rotated by the connection pin to go back to an original position by elastic force, thereby allowing the knob body to be locked to the shift rod by the connection pin being locked to the locking part, wherein the locking part is elastically moved back to the original position after the connection pin moves up into the locking part, making the locking part rotate.

2. The shift knob assembly of claim 1, further comprising:
a guide part mounted to the upper portion of the locking part in the mounting space of the knob body, the guide part being open at a center of the guide part so as to allow the coupling part of the knob body to pass therethrough, and guiding rotation of the locking part in the circumferential direction by being connected to the locking part.

3. The shift knob assembly of claim 2, wherein:
at least one guide protrusion is provided on an outer circumference of the locking part by protruding upward; and
a guide channel is provided in the guide part by being open for allowing the guide protrusion to be inserted thereinto, the guide channel extending in a same direction as a rotating direction of the locking part.

4. The shift knob assembly of claim 2, further comprising:
a damper part for locking the guide part, the damper part being fitted into the guide part in the mounting space of the knob body.

5. The shift knob assembly of claim 4, wherein the coupling part of the knob body is in an oval shape and each of centers of both the guide part and the damper part, into which the coupling part is inserted, is in an oval shape so as to surround the inserted coupling part.

6. The shift knob assembly of claim 4, wherein:
at least one locking groove is provided on a circumferential surface of the damper part; and
a locking piece for being hooked to the at least one locking groove is provided in the guide part by extending upward.

7. The shift knob assembly of claim 4, wherein:
a slit corresponding to the connection pin is provided along an inner circumference of the guide part; and
an elastic protrusion is provided in the slit, the elastic protrusion being capable of being elastically deformed and coming into contact with the connection pin.

8. The shift knob assembly of claim 4, wherein a plurality of support protrusions are provided on a surface of the guide part that the damper part directly contacts by protruding, the plurality of support protrusions coming into contact with the damper part.

9. The shift knob assembly of claim 1, wherein a locking protrusion is provided on an inner circumference of the locking part by protruding toward the axial center of the locking part so as to come into contact with the connection pin.

10. The shift knob assembly of claim 9, wherein the locking protrusion has a flat surface, and has a sloping surface inclined in a rotating direction of the locking part.

11. The shift knob assembly of claim 1, wherein the elastic part is a spring that is configured such that a first end of the elastic part is connected to the locking part, and a second end of the elastic part is connected to the knob body so as to elastically return the locking part to the original position when the locking part is rotated.

12. The shift knob assembly of claim 11, wherein a spring accommodation groove for receiving the elastic part is provided in the locking part, with a passage groove formed on a side of the spring accommodation groove, thereby allowing the second end of the elastic part to be connected to the knob body in a state where the first end of the elastic part is connected to the locking part.

13. The shift knob assembly of claim 1, wherein at least one extension part is provided on an outer circumference of the locking part by extending downward, with a dismounting groove formed on a lower most axial end of the at least one extension part.

14. The shift knob assembly of claim 13, further comprising:
a dismounting part being disposed at an end of the at least one extension part of the locking part at which the dismounting groove is formed and being in a ring shape with an opening in a center of the dismounting part, wherein the dismounting part includes:
an insertion protrusion protruding upward for being inserted into the dismounting groove; and
at least one insertion groove formed on an outer circumference of the dismounting part by being notched inwards.

15. The shift knob assembly of claim 14, wherein:
a hook is provided at the lower end of the at least one extension part of the locking part by protruding sideways; and
a locking hole is provided in the dismounting part for allowing the hook to be locked by being hooked thereto.

16. The shift knob assembly of claim 1, wherein the shift rod includes a skirt part for elastically supporting the knob body from a bottom of the knob body via an elastic spring.

17. The shift knob assembly of claim 1, wherein the knob body includes a covering part for covering the mounting space, the covering part being bolted to the coupling part.

* * * * *